US011010245B2

United States Patent
Lien et al.

(10) Patent No.: US 11,010,245 B2
(45) Date of Patent: May 18, 2021

(54) MEMORY STORAGE APPARATUS WITH DYNAMIC DATA REPAIR MECHANISM AND METHOD OF DYNAMIC DATA REPAIR THEREOF

(71) Applicant: Winbond Electronics Corp., Taichung (TW)

(72) Inventors: Chuen-Der Lien, San Jose, CA (US);
Ming-Huei Shieh, San Jose, CA (US);
Seow-Fong Lim, San Jose, CA (US);
Ngatik Cheung, San Jose, CA (US);
Chi-Shun Lin, San Jose, CA (US)

(73) Assignee: Winbond Electronics Corp., Taichung (TW)

( * ) Notice: Subject to any disclaimer, the term of this patent is extended or adjusted under 35 U.S.C. 154(b) by 76 days.

(21) Appl. No.: 16/455,769

(22) Filed: Jun. 28, 2019

(65) Prior Publication Data
US 2019/0391874 A1     Dec. 26, 2019

Related U.S. Application Data

(63) Continuation-in-part of application No. 16/015,175, filed on Jun. 21, 2018, now abandoned.

(51) Int. Cl.
*G06F 11/10* (2006.01)
*G06F 3/06* (2006.01)

(52) U.S. Cl.
CPC ........ *G06F 11/1076* (2013.01); *G06F 3/0604* (2013.01); *G06F 3/0659* (2013.01); *G06F 3/0673* (2013.01); *G06F 11/1048* (2013.01)

(58) Field of Classification Search
CPC .. G06F 11/1076; G06F 3/0604; G06F 3/0659; G06F 3/0673; G06F 11/104
(Continued)

(56) References Cited

U.S. PATENT DOCUMENTS 5,956,352 A * 9/1999 Tatosian .............. G06F 11/1024
714/42
6,487,685 B1 * 11/2002 Stuart Fiske ....... G06F 11/1008
365/185.03
(Continued)

FOREIGN PATENT DOCUMENTS

WO     2016044265      3/2016

OTHER PUBLICATIONS

Lu et al., Adaptive ECC Techniques for Yield and Reliability Enhancement of Flash Memories, 2016, IEEE, pp. 287-292. (Year: 2016).*

(Continued)

*Primary Examiner* — John J Tabone, Jr.
(74) *Attorney, Agent, or Firm* — JCIPRNET

(57) ABSTRACT

The disclosure is directed to a memory storage apparatus having a dynamic data repair mechanism. The memory storage apparatus includes a connection interface; a memory array; and a memory control circuit configured at least to: receive, from the connection interface, a write command which includes a user data and an address of the user data; encode the user data as a codeword which includes the user data and parity bits; write the codeword, in a first memory location of the memory array, as a written codeword; perform a read procedure of the written codeword to determine whether the written codeword is erroneously written; and store a redundant codeword of the user data in a second memory location in response to having determined that the written codeword is erroneously written.

14 Claims, 5 Drawing Sheets

(58) Field of Classification Search
USPC ....... 714/764, 766, 768, 769, 773, 774, 782, 714/799, 800, 805
See application file for complete search history.

(56) References Cited

U.S. PATENT DOCUMENTS

| | | | | |
|---|---|---|---|---|
| 8,732,557 | B2* | 5/2014 | Ratnam | G06F 11/10 714/773 |
| 9,298,545 | B2* | 3/2016 | Ratnam | G06F 11/10 |
| 9,430,326 | B2* | 8/2016 | Barndt | G06F 11/1068 |
| 9,619,318 | B2* | 4/2017 | Leininger | G06F 11/1016 |
| 9,626,244 | B2* | 4/2017 | Sohn | G11C 29/848 |
| 9,778,978 | B2* | 10/2017 | Shiratake | G06F 11/1008 |
| 2004/0153902 | A1* | 8/2004 | Machado | G06F 11/1068 714/710 |
| 2005/0060628 | A1* | 3/2005 | Spencer | G06F 13/16 714/752 |
| 2012/0030539 | A1* | 2/2012 | Graef | H03M 13/1102 714/758 |
| 2012/0311406 | A1* | 12/2012 | Ratnam | G06F 11/1068 714/768 |
| 2014/0245097 | A1* | 8/2014 | Larsen | G11C 29/52 714/755 |
| 2015/0324252 | A1* | 11/2015 | Larsen | G06F 11/1068 714/766 |
| 2016/0026525 | A1* | 1/2016 | Barndt | G06F 11/1068 714/773 |
| 2016/0156372 | A1* | 6/2016 | Motwani | G06F 11/1076 714/755 |
| 2016/0276035 | A1* | 9/2016 | So | G11C 29/52 |
| 2017/0109232 | A1* | 4/2017 | Cha | G06F 3/0679 |
| 2019/0122746 | A1* | 4/2019 | Berger | G11C 29/814 |
| 2019/0371391 | A1* | 12/2019 | Cha | G06F 11/1076 |

OTHER PUBLICATIONS

Su et al., An Integrated ECC and Redundancy Repair Scheme for Memory Reliability Enhancement, 2005, IEEE, pp. 1-9. (Year: 2005).*

Tilak et al., A Review paper on the Memory Built-In Self-Repair with Redundancy Logic, May 2015, International Journal of Engineering and Applied Sciences , ISSN: 2394-3661, vol. 2, Issue-5, pp. 31-35. (Year: 2015).*

"Office Action of Taiwan Counterpart Application", dated Feb. 3, 2020, p. 1-p. 8.

* cited by examiner

MEMORY STORAGE APPARATUS WITH DYNAMIC DATA REPAIR MECHANISM AND METHOD OF DYNAMIC DATA REPAIR THEREOF

CROSS REFERENCE TO RELATED APPLICATION

This application is a continuation in part of and claims the priority benefit of U.S. application Ser. No. 16/015,175 filed on Jun. 21, 2018, now pending. The entirety of the above-mentioned patent application is hereby incorporated by reference herein and made a part of specification.

TECHNICAL FIELD

The disclosure is directed to a memory storage apparatus with dynamic data repair mechanism and method of dynamic data repair thereof.

BACKGROUND

Generally, a user data to be written into a rewritable non-volatile memory (NVM) may be encoded into a codeword according to a particular error correcting codes (ECC) scheme. A codeword typically includes a user data to be stored, parity bits which correspond to the particular ECC scheme, and optionally other miscellaneous flag bits. The codeword read from the rewritable non-volatile memory may also be processed by a corresponding decoding procedure to restore to the original user data.

As the NVM is approaching an end of a life cycle, errors may occur during a write process. The NVM would need a way to repair the user data written on the NVM when errors were to occur in order to extend the life of the NVM.

When the NVM is still being tested in the factory, a re-write process which is without any time limit could be implemented if an error is detected. Further, the NVM may re-write an entire row or an entire column while the NVM is still in the factory.

However, once the NVM leaves the factory and is fully operational, the NVM is bound by a factory specification to finish the write process within the factory specification during each write cycle. Moreover, rewriting an entire row or an entire column is not an option since doing such would erase other user data that are already in storage. Therefore, a more sophisticated data repair mechanism used by the NVM while it is fully operational could be used to dynamically repair errors on the fly.

SUMMARY OF THE DISCLOSURE

Accordingly, the present disclosure is directed to a memory storage apparatus with dynamic data repair mechanism and method of dynamic data repair thereof.

In an aspect, the disclosure is directed to a memory storage apparatus having a dynamic data repair mechanism, the memory storage apparatus includes a connection interface connecting externally to a component of a host system; a memory array; and a memory control circuit coupled to the connection interface and the memory array and is configured at least to: receive, from the connection interface, a write command which includes a user data and an address of the user data; encode the user data as a codeword which includes the user data and parity bits; write the codeword, in a first memory location of the memory array, as a written codeword; perform a read procedure of the written codeword to determine whether the written codeword is erroneously written; and store a redundant codeword of the user data in a second memory location in response to having determined that the written codeword is erroneously written.

In an aspect, the disclosure is directed to a method of perform dynamic data repair used by a memory storage apparatus, the method including receiving, from a connection interface, a write command which comprises a user data and an address of the user data; encoding the user data as a codeword which comprises the user data and parity bits; writing the codeword, in a first memory location of a memory array, as a written codeword; performing a read procedure of the written codeword to determine whether the written codeword is erroneously written; and storing a redundant codeword of the user data in a second memory location in response to having determined that the written codeword is erroneously written.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
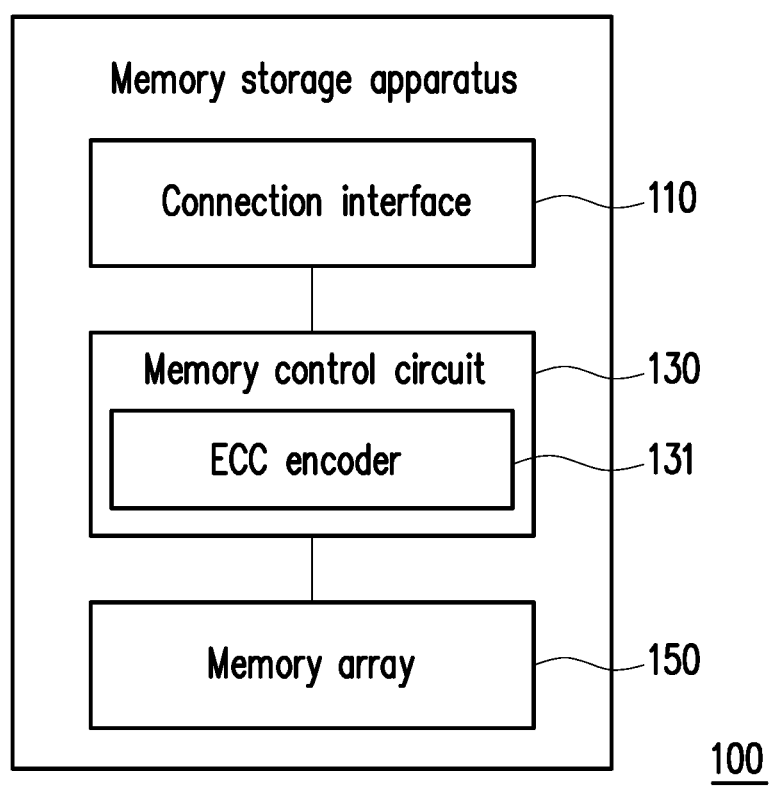
FIG. 1 is a schematic block diagram illustrating a memory storage apparatus with a dynamic data repair mechanism in accordance with one of the exemplary embodiments of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

To meet the above described challenges, the disclosure provides a data repair mechanism used by a memory storage apparatus after the memory storage apparatus is fully operational in order to dynamically repair errors on the fly. As the memory storage apparatus has left the factory and is fully operational, the memory storage apparatus has to be able to finish a write operation within a predetermined time which is defined according to a factory specification. Thus, if the memory storage apparatus encounters an error, the memory storage apparatus has to be able to repair the error within the predetermined time without affecting the normal operation so that it meets the standard as set by the specification.

In general, after the memory storage apparatus has left the factory and is fully operational, it is quite difficult to detect whether the memory storage apparatus has any faulty memory cells unless a write operation is performed to be followed by a subsequent read operation. In order to detect an error from a write operation, a subsequent read operation would be required otherwise no error can be known. If memory storage apparatus is still in the factory, a re-write operation can be performed in the case of an error without being limited by the product specification. Even if an error has been detected, it might be difficult to repair the error within a predetermined period as required by the product specification.

However, the disclosure provides a solution to dynamically repair errors of the memory storage apparatus on the fly. One of the inventive concepts includes performing a write operation by encoding user data along with parity bits under a particular error correction code (ECC) scheme into a codeword which is then subsequently written into a memory location. After the write operation is complete, a read operation is performed to verify the write operation has successfully written the codeword. In other words, the user data as written into the memory location should match its original value otherwise an error has occurred. Under the circumstance in which the read operation has indicated that the write operation has not successfully written the codeword into the memory location, then the memory storage apparatus would attempt a repair operation to repair the error. The repair operation should be finished before a predetermine time as defined by the product specification. The predetermine time is upper limit of the write operation. Thus, regardless of whether repair operation is performed or not, the write operation has to complete before the predetermined time.

In order to complete the write operation before the predetermined time for the memory storage apparatus that has left the factory and is in use by a user, the disclosure provides a mechanism of dynamically repairing the memory storage apparatus on the fly. The repair mechanism involves repairing the memory storage apparatus in a per word basis. Typically, a repair operation would involve replacing an entire row or an entire column. However, this is not practical once the memory storage apparatus is in use by a user as doing such would erase existing user data. After a write operation has failed, the mechanism would involve writing the codeword to another location that is different from the previous location in the per word basis. In the words, the codeword is to be written into another location as a redundant codeword in a data word as a unit. The redundant codeword may include a partial address of the user data, a complete address of the user data.

Whether the address or partial address of the user data is stored under the same codeword as the redundant codeword or not may depend on whether the address may fit under the same codeword. If the address is too long and exceeds the length of the redundant codeword, then the address would be stored as a separate codeword. Further, the entire address of the user data may not have to be stored as long as the location of the user data can be found. If the block address, or row address or column address of the user data could be known without having it being recorded, the partial address may suffice. For instance, if the address of user data is stored in the same row as the redundant codeword, then the row address of the user data may not be needed since the row address could be known. The same rationales apply if the address of the user data is stored in the same column or the same block as the codeword.

To explain the above described inventive concepts, the disclosure provides a memory storage apparatus with dynamic data repair mechanism and a method of dynamic data repair used by the memory storage apparatus. The disclosure provides a memory storage apparatus as shown in FIG. 1. Referring to FIG. 1, the memory storage apparatus 100 includes a connection interface 110, a memory control circuit 130, and a memory array 150. In one embodiment, the memory storage apparatus 100 is a rewritable non-volatile memory, and the memory array 150 includes a plurality of rewritable non-volatile memory cells.

In one embodiment, the connection interface 110 is configured to couple to a component of a host system (not shown) through a Serial Advanced Technology Attachment (SATA) standard. In other embodiments, the connection interface 110 may comply with the Parallel Advanced Technology Attachment (PATA) standard, the Institute of Electrical and Electronic Engineers (IEEE) 1394 standard, or other suitable standards, which is not limited in the invention. In one embodiment, the connection interface 110 may be packaged with the memory control circuit 130 in one chip or laid outside a chip having the memory control circuit 130.

The memory control circuit 130 is coupled to the connection interface 110 and the memory array 150, and configured to execute a plurality of logic gates or control commands which are implemented in a hardware form or in a firmware form and perform operations such as data writing, reading or erasing in the memory array 150 according to the command of the host system.

In one embodiment, the memory storage apparatus 100 is a rewritable NVM adopting an ECC scheme, where the memory control circuit 130 further includes an ECC encoder 131 for encoding the data word received through the connection interface 110 so as to generate a codeword which is subsequently written into the same memory array 150. The memory array 150 is coupled to the memory control circuit 130 including a plurality of memory cells (e.g., rewritable non-volatile memory cells). In one embodiment, the host system transmits a write command to the memory storage apparatus 100 for writing data word thereto, and then the memory control circuit 130 encodes the data word into a codeword and stores the codeword in the memory array 150, in response to the write command.

In one of the exemplary embodiments, the memory control circuit 130 could be configured at least for receiving, from the connection interface 110, a write command which comprises a user data. Next, the user data along with parity bits under a particular ECC scheme could be encoded by the memory control circuit 130 as a codeword. The codeword could be written memory control circuit 130, in a first memory location of the memory array 150, as a written codeword; The memory control circuit 130 may perform a read procedure of the written codeword to determine whether the written codeword is erroneously written. The memory control circuit 130 would then store a redundant codeword of the user data in a per word basis in a second memory location in response to having determined that the written codeword is erroneously written. The user data has an address which is the word line address of the user data. Storing in a per word basis means that user data is stored into a single codeword as a unit rather than then an entire row or entire column of the memory array 150 as a unit, and thus the dynamic data repair on the fly would repair one word data as a unit so as to enable the memory storage apparatus to be able to finish the write operation as required by its factory specification.

Whether the written codeword is erroneously written or not is determined by memory control circuit 130 based on whether a number of predefined bit errors has been exceeded. The number of predefined bit errors could be, for example, a number from 1 bit to 4 bits based on the particular ECC scheme being used. If the number of predefined bit errors has been exceeded, then the write operation to the first memory location is considered to have failed.

If the memory control circuit 130 have determined that the written codeword is erroneously written, then the memory control circuit 130 may re-write the first memory location by using a strong write operation which involves a long write time, a higher write voltage, and/or a higher read verify level. Also, if the memory control circuit 130 have determined that the written codeword is erroneously written, then storing the redundant codeword would need to finish before the write operation has to be finished based on a predetermined time required by the product specification of the memory storage apparatus 100.

The entire write operation of the memory storage apparatus 100 could be suspended in response to the connection interface 110 receiving another command. The write operation may resume after another command has been received or implemented.

If the bits of the first memory location has been damaged, the user data of the redundant codeword could be used as a flag or parities to indicate that the existence of the redundant codeword or the first memory location has been damaged. If the first memory location becomes good again, then the second memory location which stores the redundant codeword could be released for other uses. Whether the first memory location becomes good again can be determined by reading the content from the first memory location to compare with the intended original content to be written into the first memory location. Further, once the first memory location has been damaged to render the write operation into the first memory location as a failure, the written codeword could be recovered by applying a recovering algorithm upon the redundant codeword. The recovering algorithm could be applied while the memory storage device 100 is during a power up operation or when the memory storage device 100 is in an idle state while a recover command is being received.

The writing of the redundant codeword into the second memory location may occur in a volatile memory or in the memory array 150. If the error of the first memory location causing the write operation to be unable to finish within a predetermined time as required by the product specification, then the redundant codeword could be stored into the volatile memory to be transferred to the memory array 150 in a future time. Otherwise, the writing of the redundant codeword into the second memory location would occur in the memory array 150. The writing of the redundant codeword into the second memory location may occur while the memory storage device 100 is normally operating or is in the process of being powered down.

Figure 2:
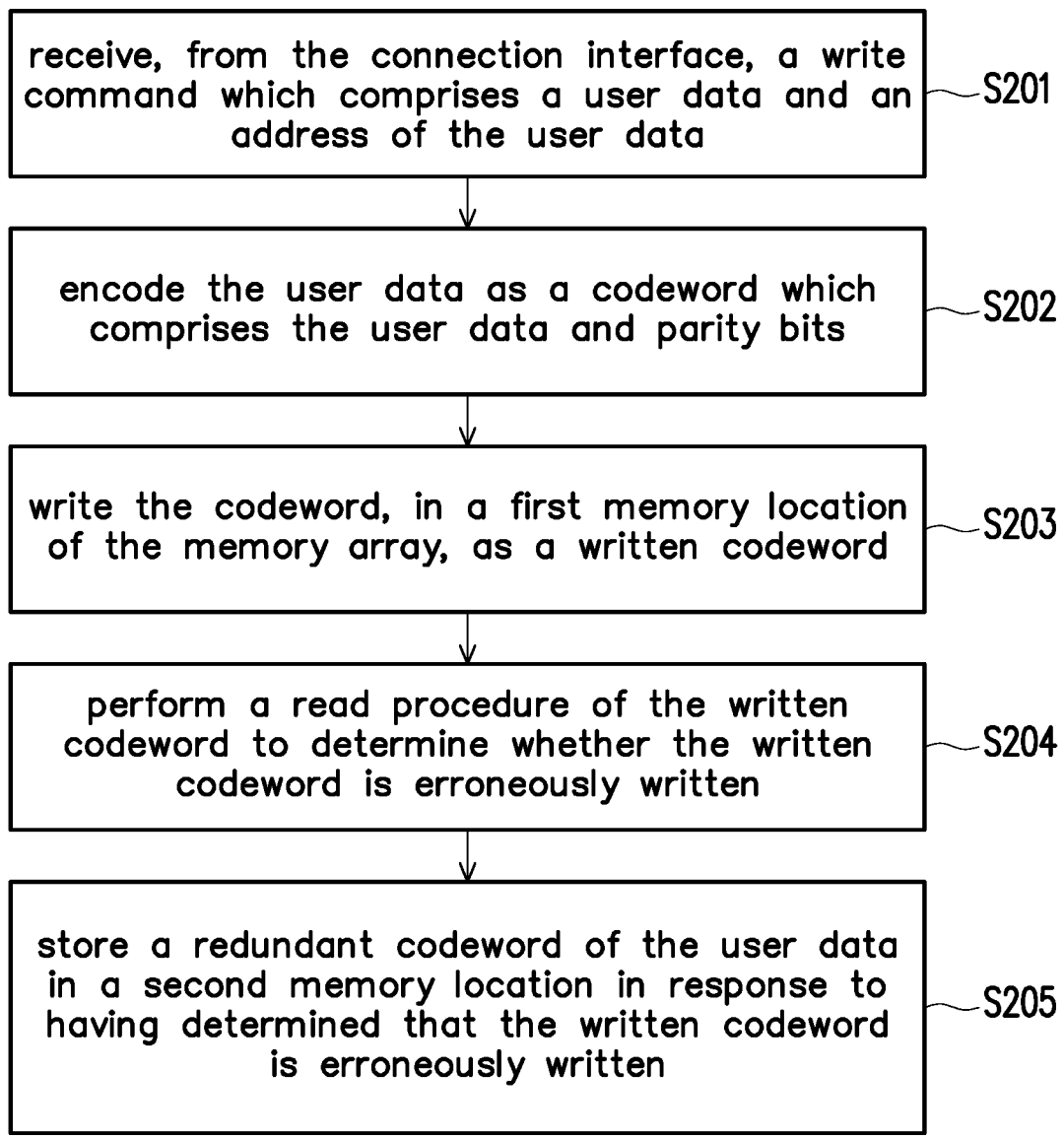
FIG. 2 is a flowchart illustrating a dynamic data repairing method used by a memory storage apparatus in accordance with one of the exemplary embodiments of the disclosure.

FIG. 2 is a flowchart illustrating a dynamic data repairing method used by the memory storage apparatus in accordance with one of the exemplary embodiments of the disclosure. In step S201, the memory control circuit 130 would receive, from a connection interface, a write command which includes a user data. In step S202, the memory control circuit 130 would encode the user data as a codeword which includes the user data and parity bits. In step S203, the memory control circuit 130 would write the codeword, in a first memory location of a memory array 150, as a written codeword. In step S204, the memory control circuit 130 would perform a read procedure of the written codeword to determine whether the written codeword is erroneously written. In step S205, the memory control circuit 130 would store a redundant codeword of the user data in a per word basis in a second memory location in response to having determined that the written codeword is erroneously written.

It is worth noting that the method of performing dynamic data repair used by a memory storage apparatus is implemented after the memory storage apparatus is out of production and is already being used by a user. In one of the exemplary embodiments, the storing of the redundant codeword would also involve storing an address of the user data, and the address could be a word line address of the first memory location. The redundant codeword is stored in a word by word basis rather than an entire row or column. The address could be a partial address or a complete address. If the address is a partial address, then the address could be a row address, a column address, or a block address. The address could be stored together within the redundant codeword or stored separately apart from the redundant codeword. Whether the address is stored within the same or apart from the redundant codeword could be based on whether the address and the user data can fit within the same written codeword or the same redundant codeword. The content of the redundant codeword could be identical to the written codeword. The address of the redundant codeword could be ECC encoded or not encoded.

In one of the exemplary embodiments, performing a read procedure of the written codeword to determine whether the written codeword is erroneously written would include determining whether a number of bit errors from the read procedure exceed a predefined number. If the number of bit errors exceed the predefined number, then the written codeword could be considered as being erroneously written.

In one of the exemplary embodiments, the method of dynamic data repair could be paused upon receiving, from the connection interface, another command which would suspect operations of the method of dynamic data repair such as the operation for storing the redundant codeword in a second memory location.

In one of the exemplary embodiments, both the first memory location and the second memory location could be simultaneously read whenever memory storage device needs to access the content of the written codeword or redundant codeword.

Figure 3:
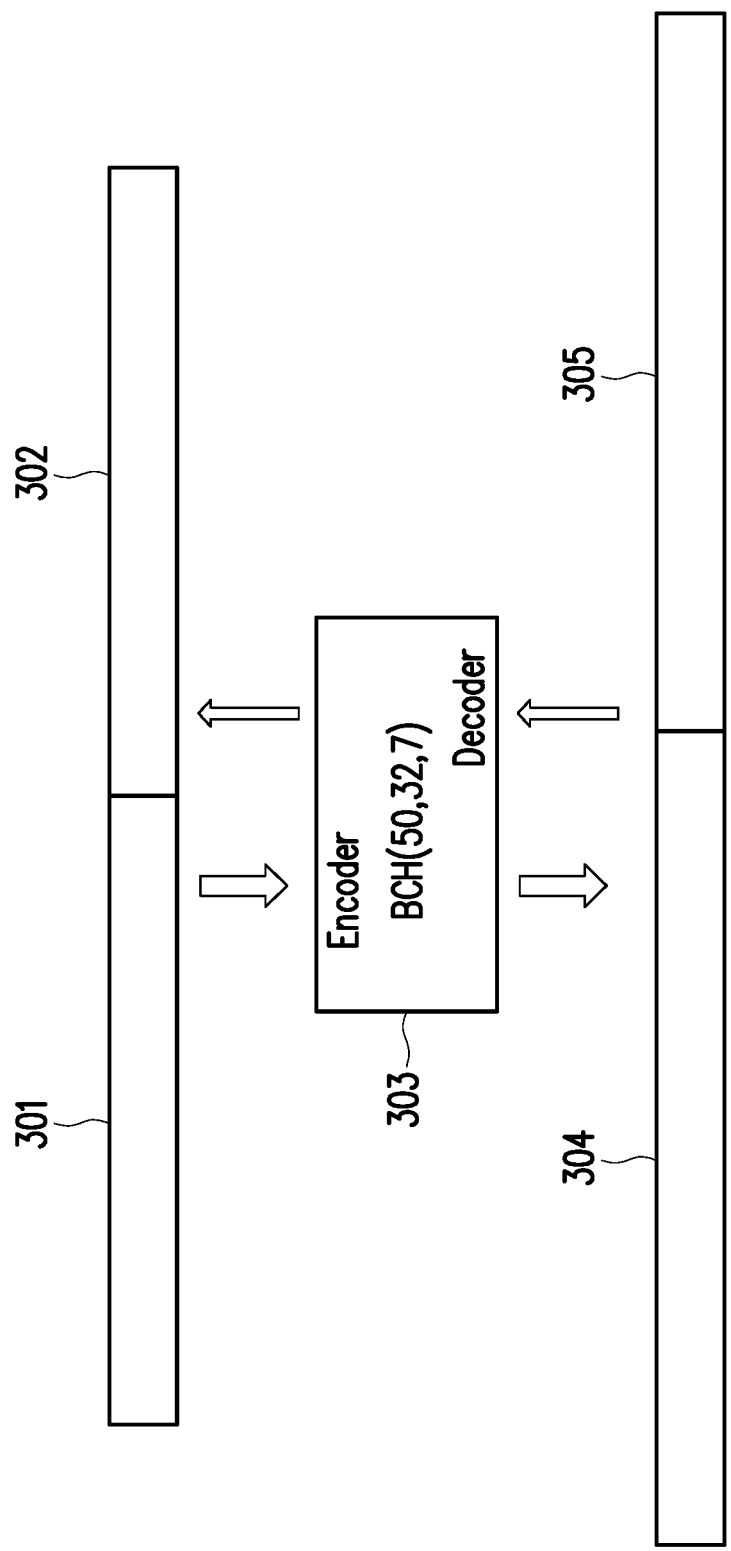
FIG. 3 is a schematic diagram illustrating a dynamic data repairing method used by a memory storage apparatus in accordance with a first exemplary embodiment of the disclosure.

FIG. 3 is a schematic diagram illustrating a dynamic data repairing method used by a memory storage apparatus in accordance with a first exemplary embodiment of the disclosure. Referring to FIG. 3, the memory control circuit (e.g. 130) is assumed to implement an ECC encoder 303 modified by BCH (50, 32, 7) in which the ECC encoder 303 is assumed to encodes a data word into a codeword. For instance, the data word could be 32 bits and the codeword could be 50 bits. The codeword may contain data word (i.e. user data), parity bits, and optionally some flag bits. Upon receiving a write data command, the ECC encoder 303 would encodes the data word into a 50-bit codeword using a particular ECC code. Upon the 50-bit codeword being written into a first memory location of the memory array (e.g. 150), the memory control circuit (e.g. 130) would perform a read verify procedure to determine the data integrity of the 50-bit codeword which has been written.

Assuming that the memory array (e.g. 150) is near the end of its life cycle, bit errors would likely occur. If the 50-bit codeword being written into the first memory location has failed, then the memory control circuit (e.g. 130) would attempt to store a redundant data word to be encoded into a redundant 50-bit codeword in a second memory location. For this exemplary embodiment, the redundant data word may contain user data 301 and address bits 302 to indicate the location of the user data 301 assuming that the user data 301 and address bits 302 can both fit into the same 32-bit message bits. In other words, the 32-bit redundant data word (301 & 302) would contain a duplicate data word of the original user data 301 in combination with at least a part of or all of the address bits 302 of the user data 301. The above described redundant data word (301 & 302) would then be encoded by a particular ECC code which could be a BCH encoder/decoder 303 as shown in this example. The redundant data word (301 & 302) would be encoded into a redundant codeword which would include bits of the redundant data word 304 and parity bits 305. The redundant codeword (304 & 305) which could be 50 bits or more could also be decoded by the BCH encoder/decoder 303 to recover the redundant data word (301 & 302).

In an alternative variation, the address bits 302 of the redundant data word is not encoded by the encoder 303, and thus the address bits of the redundant codeword (304 & 305) could be unencoded by the encoder. In an alternative variation, the address bits of the redundant codeword (304 & 305) could be a row address, a column address, or a block address of the user data 301 since it is possible that the complete address of the user data 301 is not required as long as the first memory location could be found by using just a partial address.

Figure 4:
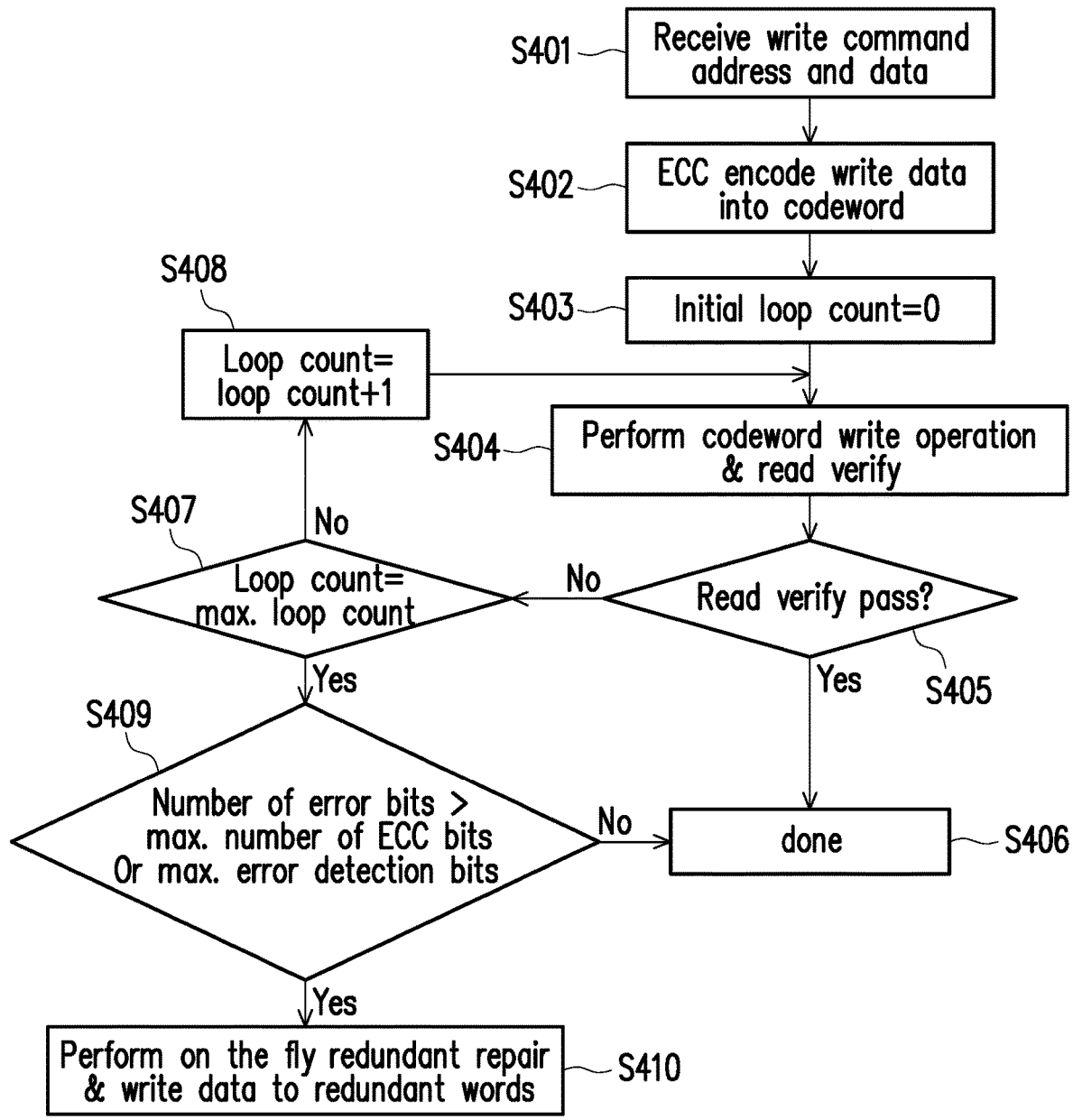
FIG. 4 is a detailed flow chart of a dynamic data repairing method used by a memory storage apparatus in accordance with one of the exemplary embodiments of the disclosure.

FIG. 4 is a detailed flow chart which determines whether the dynamic data repairing method used by a memory storage apparatus would be performed or not in accordance with one of the exemplary embodiments of the disclosure. In step S401, a memory storage apparatus (e.g. 100) would receive, through a connection interface (e.g. 110), a write command which includes message bits or data word to be written in the memory array (e.g. 150) and an address of the data word to be written. The address would indicate the location in the memory array (e.g. 150) for the data word to be written. The write command could be received from a component such as a central processor of a host which could be a user end device such as a mobile phone, a laptop, a PC, and etc. After receiving the write command, in step S402, the ECC encoder (e.g. 131 or 320) implemented by the memory control circuit (e.g. 130) would be configured to encode the data word into a codeword according to the particular ECC scheme used by the ECC encoder (e.g. 131 or 320). Next, in step S403, the memory control circuit (e.g. 130) would be configured to initialize the loop count variable by setting the value of the loop count variable to zero. Next, in step S404, the memory control circuit (e.g. 130) would be configured to perform a write operation to write the codeword into the memory array (e.g. 150) and subsequently perform a read operation on the codeword that has been written into the memory array (e.g. 150) in order to assess the integrity of the codeword. Each codeword is written in the unit of one word.

After assessing the integrity of the written codeword, in step S405, the memory control circuit (e.g. 130) would be configured to determine whether the written codeword has passed the integrity check. If written codeword has passed the integrity check, then in step S406, the codeword is deemed to be successfully written.

In step S407, assuming that the written codeword has failed the integrity check as the number of bit errors has exceeded a predetermined number, the memory control circuit (e.g. 130) would be configured to determine whether the loop count variable has reached a predetermined maximum loop count value. If the loop count variable has not reached the predetermined maximum loop count value, then in step S408, the value of the loop count variable would be incremented by one, and the procedure would continue from step S404. If the loop count variable has reached the predetermined maximum loop count value which means that the number of write-read iterations have exceeded a maximum value as defined by the maximum loop count value, then in step S409, the memory control circuit (e.g. 130) would be configured to determine whether the number of error bits from the written codeword has exceeded either a maximum number of ECC bits or has exceeded maximum number of error detection bits. If the number of error bits from the written codeword is both less than or equal to the maximum number of ECC bits and also is less than or equal to the maximum number of error detection bits, then the method of the dynamic data repair would not be triggered. However, if in step S409, the number of error bits from the written codeword is either greater than the maximum number of ECC bits or is greater than the maximum number of error detection bits, then in step S410, the method of dynamic data repair would be performed. Also, in step S410, the data word received from the write command would be duplicated as redundant words.

Figure 5:
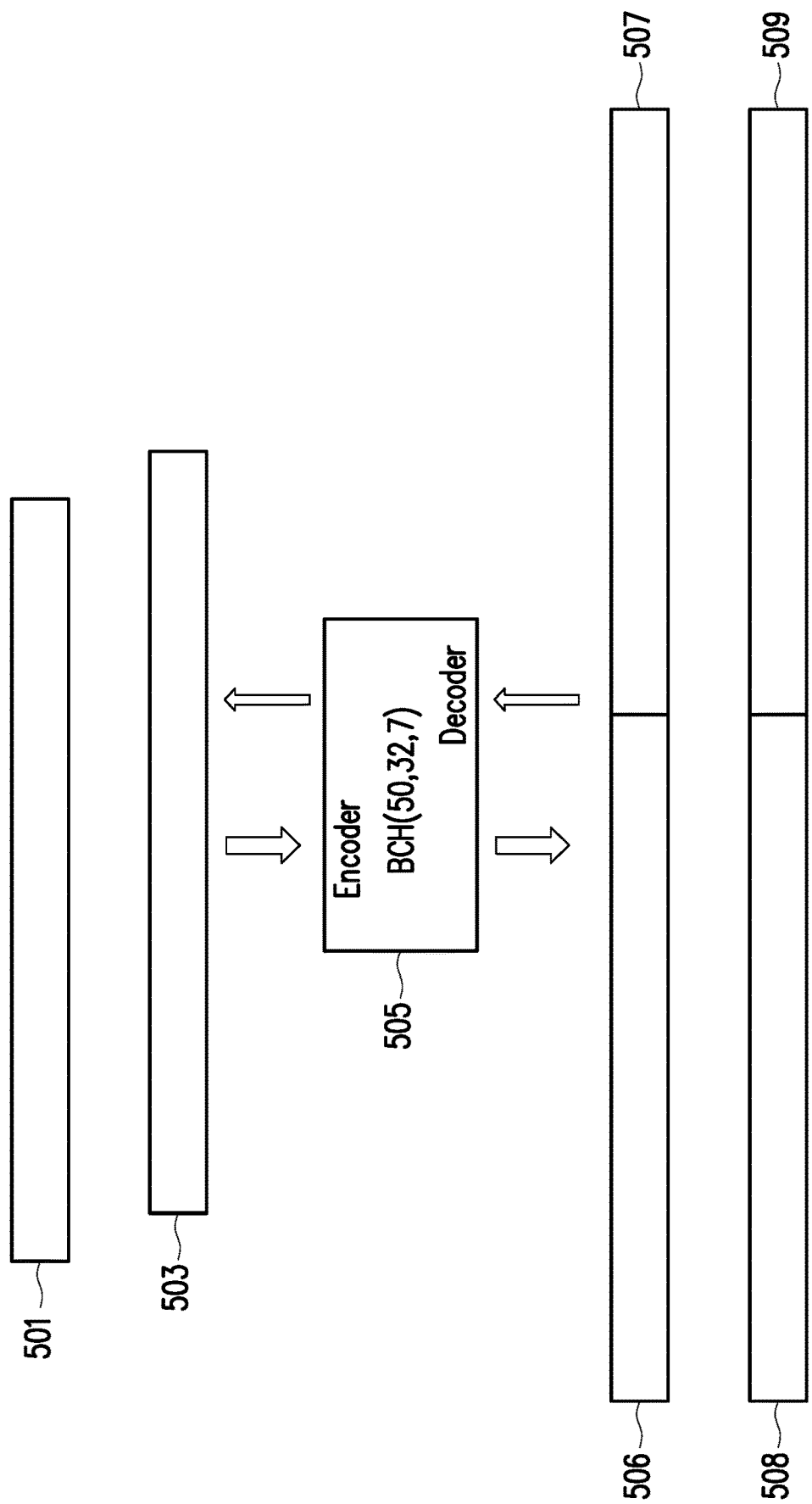
FIG. 5 is a schematic diagram illustrating a dynamic data repairing method used by a memory storage apparatus in accordance with a second exemplary embodiment of the disclosure.

FIG. 5 is a schematic diagram illustrating a dynamic data repairing method used by a memory storage apparatus in accordance with a second exemplary embodiment of the disclosure. Referring to FIG. 5, the memory control circuit (e.g. 130) is assumed to implement an ECC scheme based on a BCH (50, 32, 7) encoder/decoder 505 from which would encodes a 32 bits data word (i.e. user data) into an encoded codeword which could be a 50 bits codeword which is similar to FIG. 3. Upon receiving a write data command, the ECC encoder 303 would encodes the 32 bits data word into a 50 bits codeword by using a particular ECC code which in this example is a BCH encoder/decoder 505. The codeword would include at least data word and parity bits. Upon the codeword being written, the memory control circuit (e.g. 130) may perform a read verify procedure to determine the data integrity of the codeword.

Alternatively, in contrast with the example of FIG. 3, the memory storage apparatus of this example of FIG. 5 may encode and subsequently store a user data 501 and an address 503 of the user data 501 as two separate codewords (506 507 & 508 509). This exemplary embodiment is preferred over the exemplary embodiment of FIG. 3 if the user data 501 and the address 503 of the user data 501 cannot fit into the same redundant codeword. Assuming that is the case, user data 501 would be encoded by the encoder 505 into a redundant codeword (506 & 507) which is to be stored in a second memory location. The redundant codeword would include user data 506 and parity bits 507, and the user data 506 ideally would match the original user data 501. The address 503 of the user data 501 would be encoded by the encoder 505 into a redundant address codeword (508 & 509) which is to be stored separately from the redundant codeword (506 & 507) in a third memory location. The redundant address codeword which includes the address 508 would match the original address 503 and the corresponding parity bits 509.

The memory control circuit (e.g. 130) may determine whether the first memory location is valid once again. If the first memory location is deemed valid once again, then the second memory location which contains the redundant codeword (506 & 507) and the third memory location which contains the redundant address codeword (508 & 509) could be released and be used for a different purpose.

In an alternative variation, the address bits 503 of the user data 501 is not encoded by the encoder 505, and thus the address bits 503 could be unencoded by the encoder. In an alternative variation, the address bits 503 could be a row address, a column address, or a block address of the user data 501 since it is possible that the complete address of the original user data 501 is not required as long as the first memory location could be found by using just a partial address.

In view of the aforementioned descriptions, the disclosure is suitable for being used in a memory storage apparatus and is able to dynamically repair errors of data stored in the memory storage apparatus within a time window required by a product specification after the memory storage apparatus is already operational. In this way, the memory storage apparatus may dynamically repair errors without affecting product performance.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A memory storage apparatus having a dynamic data repair mechanism, the memory storage apparatus comprising:
    a connection interface connecting externally to a component of a host system;
    a memory array; and
    a memory control circuit coupled to the connection interface and the memory array and is configured at least to:
        receive, from the connection interface, a write command which comprises a user data and an address of the user data;
        encode the user data as a codeword which comprises the user data and parity bits;
        write the codeword, in a first memory location of the memory array, as a written codeword;
        perform a read procedure of the written codeword to determine whether the written codeword is erroneously written; and
        store a redundant codeword of redundant data that comprises the user data in a second memory location of the memory array or a volatile memory, in response to having determined that the written codeword is erroneously written,
    wherein the redundant data further comprises a part of the address of the user data or all of the address of the user data when the user data and the address of the user data fits within the redundant codeword.

2. The memory storage apparatus of claim 1, wherein the memory control circuit is further configured to:
    store the part of the address of the user data or all of the address of the user data in a separate location of the memory array or the volatile memory when the user data and the address of the user data do not fit within the redundant codeword.

3. The memory storage apparatus of claim 1, wherein the memory controller circuit is configured to perform the read procedure of the written codeword to determine whether the written codeword is erroneously written comprising:
    determine whether a number of bit errors from the read procedure exceed a predefined number; and
    confirm the written codeword as erroneously written in response to having determined that the number of bit errors having exceeded the predefined number.

4. The memory storage apparatus of claim 1, wherein the memory controller circuit is further configured to:
    perform another read procedure of the written codeword stored in the first memory location of the memory array; and
        release the second memory location in response to having determined that the another read procedure has not failed.

5. The memory storage apparatus of claim 1, wherein the memory controller circuit is configured to store the redundant codeword of the user data in the second memory location of the memory array in response to the written codeword being erroneously written comprising:
    store the redundant codeword of the user data in a per word basis in the second memory location temporarily which is the volatile memory in response to the write command not being able to complete within a required time based on a factory specification; or
    store the redundant codeword of the user data in the per word basis in the second memory location of the memory array in response to the write command being able to complete within the required time based on the factory specification.

6. The memory storage apparatus of claim 1, wherein the memory controller circuit is configured to store the redundant codeword further comprising:
    receive, from the connection interface, another command; and
    suspend storing the redundant codeword in response to receiving the another command.

7. The memory storage apparatus of claim 1, where the memory controller circuit is further configured to
    perform another read procedure by simultaneously reading from both the first memory location and the second memory location.

8. A method of performing dynamic data repair used by a memory storage apparatus, the method comprising:

receiving, from a connection interface, a write command which comprises a user data and an address of the user data;

encoding the user data as a codeword which comprises the user data and parity bits;

writing the codeword, in a first memory location of a memory array, as a written codeword;

performing a read procedure of the written codeword to determine whether the written codeword is erroneously written; and storing a redundant codeword of redundant data that comprises the user data in a second memory location of the memory array or a volatile memory, in response to having determined that the written codeword is erroneously written, wherein the redundant data further comprises a part of the address of the user data or all of the address of the user data when the user data and the address of the user data fits within the redundant codeword.

9. The method of claim 8, further comprising:
storing the part of the address of the user data or all of the address of the user data in a separate location of the memory array or a volatile memory when the user data and the address of the user data do not fit within the redundant codeword.

10. The method of claim 8, wherein performing the read procedure of the written codeword to determine whether the written codeword is erroneously written comprising:
determining whether a number of bit errors from the read procedure exceed a predefined number; and
confirming the written codeword as erroneously written in response to having determined that the number of bit errors having exceeded the predefined number.

11. The method of claim 8 further comprising:
performing another read procedure of the written codeword stored in the first memory location of the memory array; and
releasing the second memory location in response to having determined that the another read procedure has not failed.

12. The method of claim 8, wherein storing the redundant codeword of the user data in the second memory location of the memory array in response to the written codeword being erroneously written comprising:
storing the redundant codeword of the user data in a per word basis in the second memory location temporarily which is the volatile memory in response to the write command not being able to complete within a required time based on a factory specification; or
storing the redundant codeword of the user data in the per word basis in the second memory location which is part of the memory array in response to the write command being able to complete within the required time based on the factory specification.

13. The method of claim 8 further comprising:
receiving, from the connection interface, another command; and
suspending storing the redundant codeword in response to receiving the another command.

14. The method of claim 8 further comprising:
performing another read procedure by simultaneously reading from both the first memory location and the second memory location.

* * * * *